United States Patent
Schouw

[15] 3,683,594
[45] Aug. 15, 1972

[54] MODULAR FUME SCRUBBER

[72] Inventor: Arthur C. Schouw, Rte. 1, Evart, Mich. 49631

[22] Filed: Feb. 26, 1970

[21] Appl. No.: 14,355

[52] U.S. Cl. .....................55/223, 55/233, 55/250, 55/259, 55/260, 261/119
[51] Int. Cl. ...............................................B01d 47/02
[58] Field of Search......55/84, 93, 95, 220, 223, 227, 55/242, 244, 250, 259, 233, 260; 261/119, 23 R

[56] References Cited

UNITED STATES PATENTS

| | | | |
|---|---|---|---|
| 1,986,873 | 1/1935 | Yoch | 261/119 |
| 2,119,207 | 5/1938 | Gibbs | 261/119 |
| 2,197,004 | 4/1940 | Myers | 55/259 |
| 2,417,010 | 3/1947 | Mobley | 261/119 |
| 3,142,548 | 7/1964 | Krantz | 55/223 |
| 3,386,229 | 6/1968 | Reed | 261/119 |
| 3,525,197 | 8/1970 | Sheehan | 55/233 |

Primary Examiner—Bernard Nozick
Attorney—Miller, Morriss, Pappas & McLeod and William J. Morriss

[57] ABSTRACT

A fume scrubber or separator unit in a modular form adapted to be stacked vertically to multiply unit capacities and each unit including internally suspended blower means downwardly directed toward a pan of liquid or fluid to enhance removal of contaminants from the vapor or gases or mixtures thereof and each unit including a plurality of filter bed elements transversely across the rising column of gases or vapors and entrained contaminants and through which the materials for treatment must pass and including spray means directed counter to the flow through the filter bed. The blower element directs influent material downwardly against a fluid bed. Then the gases and/or vapors rise in the chamber to pass through the filter bed to exhaust. When stacked, adjacent units are spaced apart by collar-like exhaust plenums which may then be connected to a common exhaust manifold or stack.

2 Claims, 6 Drawing Figures

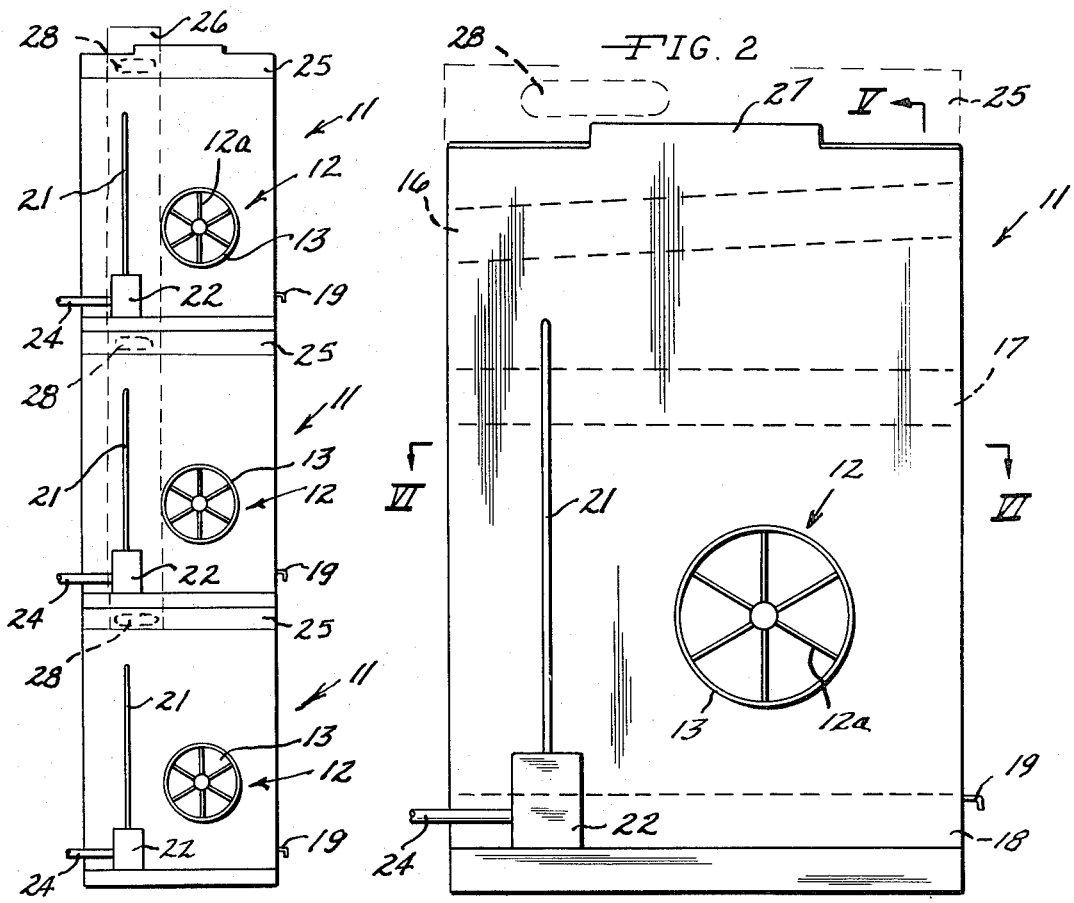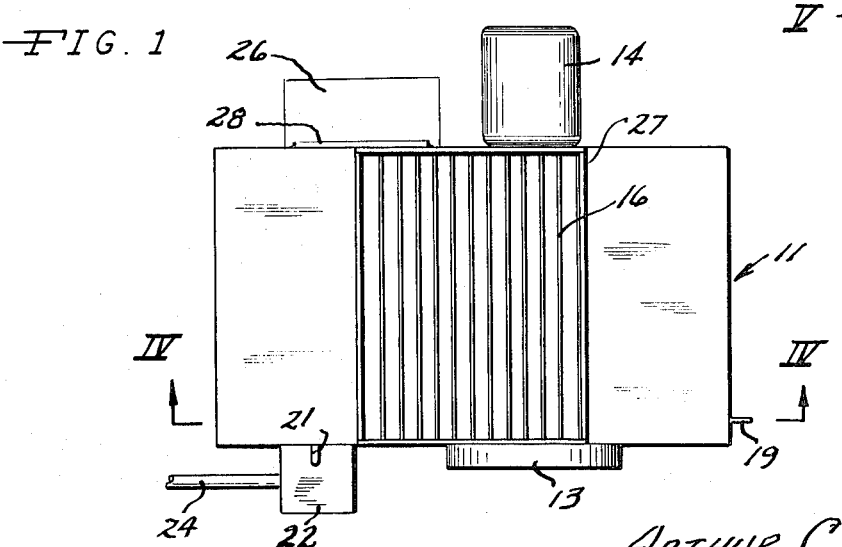

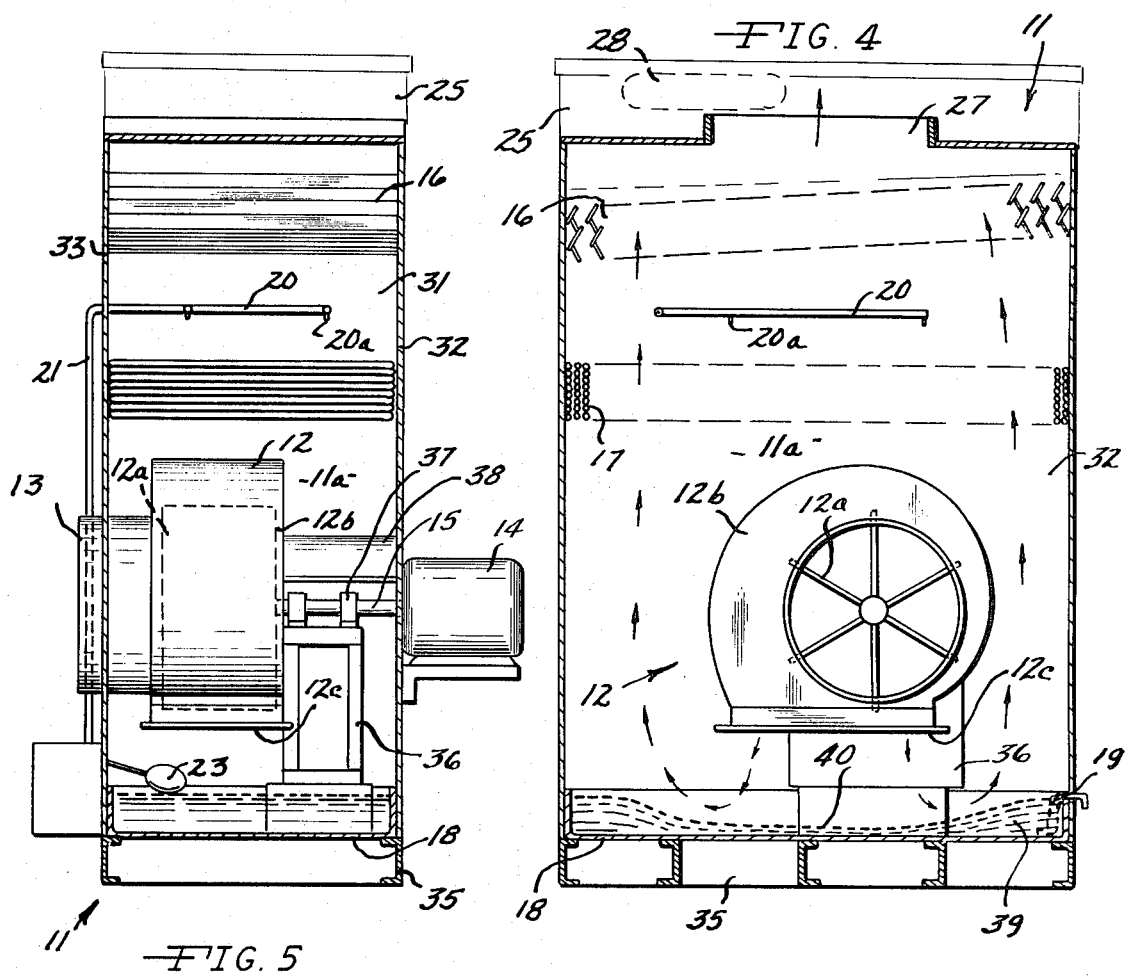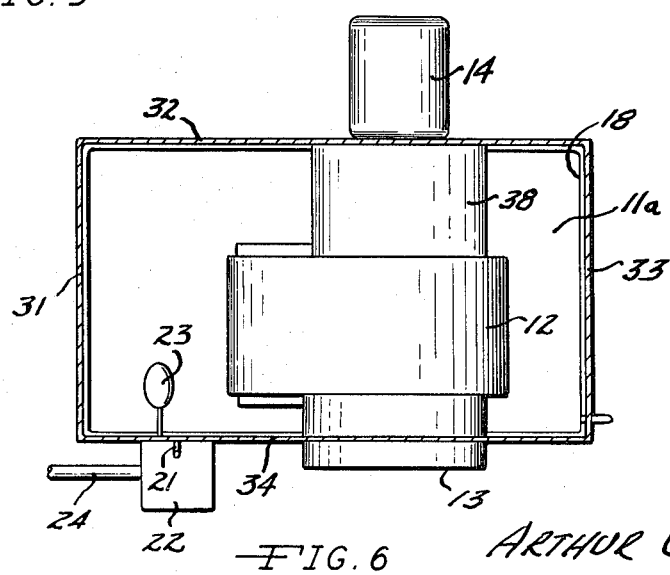

MODULAR FUME SCRUBBER

BACKGROUND AND OBJECTS

The present invention is directed to a modular type separator unit in which multiple capacities can be obtained by stacking a plurality of units on top of each other. This is of substantial importance where floor space for such devices is limited and where increasing separator capacity is required while utilizing fixed exhaust stack location and fixed location for electrical leads, hydraulic connections and the like. The present invention is also directed to a materially improved fume scrubber or separator in which influent gases and/or vapors with contaminants are directly impinged against a resilient concave surface of liquid. The influent gases and/or vapors then rise from the concave surface to pass upward around the lower housing and through a filter bed and primer spray, as desired. This is accomplished in an electrostatic removal environment to ultimate exhaust whereupon the effluent gases and/or vapor have been stripped substantially free of contaminants. In some instances of plant treated air, the air can be returned directly to the plant environment. Exhaust to plant environment or to stack can be optionally provided. Hence the total treatment by separation units in accord with the present invention involves exposure of materials to an efficient flow reversal and velocity change at entry including stripping action and direct impingement against a non-rigid surface with an area greater than the rectangular surface capabilities and wherein the reversal occurs at a concave gas-vapor-liquid interface, the liquid having a removal affinity for some contaminants.

The compact construction allows the blower housing to constrict the upward flow of gaseous materials and to thereafter expand the materials in the next separation phase in the filter bed chamber by an abrupt volume change. Then the filter beds accomplish a filtering action with available priming, as desired, and the complete flow is through the medium of resin surface contact with the gases and/or vapors so as to expose the gases and/or vapors to electrostatic precipitation which is the consequence of selected resins in the blower, casing, ducting, and filter beds. Accordingly, the present invention is easily distinguishable over the Oil Mist Collector of Carsey U.S. Pat. No. 3,353,340 and the Oil Mist Separator of Woolston U.S. Pat. No. 3,093,469 which represent the closest devices of which the inventor has knowledge.

Accordingly, the principal object of the present invention is a new separator structure having increased efficiency for fume scrubbing.

Another object is to provide a separator unit as a module of capacity allowing multiplication of capacity by vertical stacking without additional floor space.

Another object of the present invention is to provide a resilient fluid bed against which influent material is directly impinged and where surface exposure area is increased upon impingement and flow is reversed.

Another object is to provide a relatively simple separator structure which supports the blower element in a suspended manner within the case so that the blower accomplishes a restriction of a reverse flow while providing for insertion of filter beds, primer sprays, flow constriction and the like.

Other objects including case of servicing and combinations of the above specific objects will be apparent to those skilled in the art as the description proceeds.

GENERAL DESCRIPTION

The fume scrubbing or separator unit of the present invention is box-like in construction and is modular so that plural of the separator units can be stacked together one on the next beneath. The mechanical components such as motors and/or pumps are located preferably outside of the box-like casing so as to be free of the corrosive or damaging environment created within the fume scrubbing unit and at least one vertical wall is smooth with no external projections so that side by side positioning of units is also possible. The object of the external design is to permit plural units to be grouped, each unit handling a rated unit capacity so, for example, that as a plating or treating plant grows, additional units may be stacked one on top of the other and in side by side relation without major relocation and with minimum problems of additional floor space. Handling capacity can thus be increased in increments representing the collective capacity of each of the units used.

Influent material is passed into the scrubber or separator unit of the present invention from the side, the draft being induced by a blower or other air moving means housed within the casing. The blower directs the influent material vertically downward to impingement on a bottom pan. The pan is deep enough to contain a liquid useful in the separation and the surface of the liquid flexes to general concavity with supplemental local surface depressions. Such local surface depressions are ideal for the impingement of the gases upon the extended surface. Then the gases and/or vapors pass upward and around the fan housing with abrupt velocity change to and through a filter bed in the upper portion of the housing and thence to exhaust. A spacing collar provides a collecting chamber for exhaust from the unit and the collar separates the lower unit from the next uppermost. This plenum, then, selectively empties into the plant environment or into a suitable stack or duct for delivery as desired.

In the preferred embodiment two filter beds are provided, the first a horizontal wet bed, or bed that can be wetted as by a spray, and the second is a tilted bed filter. The spray is maintained by a pump from a reservoir and serves as a primer for separation and the fluid pan with overflow provides a collector function for removed particulate. The fan motor is outboard of the casing and the blower housing is suspended and supported by the casing and a blower pedestal.

The casing, ducting, filters, and blower are preferably made from resin material such as polyvinyl chloride, nylon, or other structural stock selected so that the electrostatic properties of the material are useful in electrostatic removal. The electrostatics are consequent to flow of gases and/or vapors through the system so that no electrostatic charging except for air gas and/or particle movement is needed.

The structure will be better appreciated as the description proceeds.

IN THE DRAWINGS

FIG. 1 is a side elevation view of stacked fume scrubber or separator devices in accord with the present invention showing the blower entry side of the separator and indicating how capacity can be multiplied without increase in apparatus floor space.

FIG. 2 is a side elevation view of the separator unit of the present invention showing the blower entry side of the separator unit.

FIG. 3 is a top view of the separator of the present invention indicating the vent discharge opening.

FIG. 4 is a cross section view taken on the line IV—IV in FIG. 3 and showing the direction of flow of air, gases, and included vapors and particles and the effect of this flow impinging on the surface of fluid in the bottom of the separator unit.

FIG. 5 is a cross section view taken on the line V—V in FIG. 2 and indicating level control means adjusting the fluid in the sump or pan and indicating the recirculating pump for spray priming.

FIG. 6 is a cross section view taken on the line VI—VI in FIG. 2 and indicating the positioning of the blower element in the structure oriented to deliver influent gases downward toward impingement with the collecting pan.

SPECIFIC DESCRIPTION

By reference to the drawings and particularly with reference to FIG. 1, thereof the rectangular cases 11, each defining a separator unit in accord with the invention herein are shown in vertical stacked relation so as to occupy a specific square foot area and extend upwardly in modules, each module providing a full additional unit of separator capacity. The blowers 12 comprising a fan 12a inside a scroll housing 12b are visible through ducts 13 through one side of the cases 11 and these, as will be appreciated, receive the gases or vapor and entrained contaminants for treatment in the separator units and the ducts 13 deliver the materials to be treated into the fan 12a. Hence, influent material enters the cases 11 through ducts 13 and the effluent or treated and stripped gases and vapors are passed out of the top portions of each of the units 11 through plenum collars 25 which are rectangular spacer chambers ducted to stacks 26 which may be separate or manifolded. Overflow drains 19 are visible through the wall of the casing or housing 11 and these may be connected as desired by piping to a collection reservoir. Also visible in the FIG. 1 are the pumps 22 and spray delivery tubes 21, which, as will be seen enter the internal chamber 11a (FIG. 5) formed by the casing 11. The pipes 24 may be connected to a separate source of liquid as will be seen or may be connected to the collecting reservoir fed by the overflow drains 19.

By reference to FIGS. 2 and 3 a single separator unit 11 in accord with the present invention is seen without inclusion of the plenum collar 25 which is unneeded in a single unit installation. The exhaust port 27 is illustrated and the position of collar 25 is indicated in phantom line with the stack port 28 indicated in the collar 25.

The filter beds 16 (inclined) and 17 (horizontal) are relatively shown on the interior of the casing 11. It will also be seen that the primer fluid delivery pipe 21 enters the casing 11 intermediate to two filter beds 16 and 17. The position of the pan 18 at the bottom of the casing 11 is also shown.

In FIG. 3 the upper inclined filter bed 16 is visible through the exhaust port 26, the tilt accommodates through drains formed by the transverse baffles transmitting deposited material to the internal walls of the case 11. The motor 14 is in axial alignment with the duct 13, and extends outboard of the casing 11. The position of the exhaust stack 26 is indicated in phantom line where the spacer collars 25 may be employed as the separator units are stacked. Other options of stack locations are possible where ducting is provided from the collars 25.

In FIGS. 4 and 5 it will be seen that the separator comprises an outer rectangular case 11. Inside the case 11 is mounted a blower 12. The intake of the blower 12 is connected by inlet duct 13 through the side of the case 11 to the outside of the chamber 11a formed by the case 11. The blower 12 may be driven by a motor 14 mounted on the outside of case 11 and turning drive shaft 15 extending through the side of case 11. The blower scroll 12 is mounted with its exit port 12c facing the bottom of the chamber 11a. In this construction the case 11 fully supports the blower 12 and its associated housing and drive, such as motor 14 and suspends it or positions it in spaced relation between the top and bottom of the case 11 so that flow is initially downward toward the bottom of the chamber 11a and then reverses to pass around the blower encasement 12b and upward through the filter beds 16 and 17 and out through the exhaust port 27. Filter beds 16 and 17 are removably mounted inside the case 11 above the blower 12.

Shown at the bottom of case or housing 11 is a pan 18 which holds a liquid shown by phantom lines in FIGS. 4 and 5. A controlled overflow drain 19 connected to the pan 18 extends through a side of case 11. The drain 19 extends below the surface of the liquid and into close proximity with the bottom of the pan 18 so as to remove collected debris which settles in the liquid.

Also mounted within the case 11, above the blower 12, is a primer spray head 20 having one or more nozzles 20a. The spray head 20 extends through a side of the case 11 and connects with primer spray delivery tube 21. The primer spray delivery tube 21 is connected to a pump 22 shown schematically in the drawings. The pump 22 is connected through the side of the case 11 to the pan 18, providing means of delivering liquid contained in the pan 18 or reservoir (not shown) to the primer spray head 20. A float 23 attached to a suitable switch device may be provided which automatically actuates the pump 22, and may control thereby the pan level of fluid as described hereinafter. Pipe 24 connects with an external reservoir or source of liquid to be delivered to the primer spray head 20 which may include the filtered and returned liquid flowing out of the pan 18.

In the FIGS. 4, 5 and 6 the simplicity of construction of the case 11 is best illustrated as comprising four sides 31, 32, 33 and 34. These are closed at the bottom by the pan 18 resting on a plurality of base elements 35, such as channels as shown. The base elements 35 in supporting the pan 18 also support the journal pedestal 36 which extends upwardly in the chamber 11a to support the horizontal drive shaft 15 on the bearings 37. The shaft 15 supports the rotating blade 12a in the housing of the blower 12. The blower 12 is illustrated as a squirrel cage type blower in a scroll housing 12b and is directed downwardly substantially toward the center of the pan 18 as seen in FIG. 4 and FIG. 6. A superstructure or canopy 38 covers the shaft 15 and bridges between the wall 32 and the blower 12 to provide additional support in suspending the blower 12 in transverse position across the chamber 11a and intermediate the pan 18 and the upper exhaust port 27. The impingement of gases and vapors from the blower 12 on liquid 39 in the pan 18 causes deformation of the liquid surface 40 as shown and causes overflow through the overflow drain 19. As previously described, the overflow is received from the bottom of the pan 18. This deformation increases the surface area for contact with influent materials and resiliently directs a reversal of flow upward and around the fan or blower housing 12 as shown.

The float 23 connected to pump 22 directs the pump 22 to activate the spray 20 when the liquid level drops below a desired point. The pump 22 may be fed from overflow liquid or a separate supply of liquid as desired and need not in some instances be controlled by the float 23.

The generally rectangular form of the case 11 assures economical construction using sheet poly vinyl chloride for example for the blower 12, its blades 12a and housing 12b, sides 31-34 inclusive, pan 18 and conduit 13. The motor 14 operates through the wall 32 in avoidance of contact with contaminants and the plenum collar 25 acting as a conduit spacer between adjacent cases 11 can also be formed from selected resin material. The foraminous filter 17 is a resin packed bed through which the material must pass to exhaust and the filter bed 17 contains planar baffles in plural stages which are also formed from selected resin material.

Construction is by resin welding, for example, and the particular resin is selected in accord with material to be stripped from the influent gases and/or vapors and in accord with the desired electrostatic properties sought to accomplish removal.

OPERATION

In operation influent contaminated gases and/or vapors enter the unit 11 from the entry 13 to the fan 12. The fan or blower 12 impinges the influent material on the resilient liquid bed in the pan 18 at increased velocity. The liquid surface in the pan 18 is thus greatly expanded by a "dishing" action and by local "-dimpling." Then the gases and/or vapors rise upward toward exhaust through the port 27 and into the stack 26 or plenum collar 25. As the gases rise around the fan 12 they are subjected to an increase in velocity and a subsequent decrease in velocity and then through plural filters 16 and 17 and to final expulsion at exhaust. A spray 20 intermediate the filters is selectively available to prime the system or to provide a liquid wetting of filter surface area. Where it is wanted to increase the capacity of the system an additional unit 11 is positioned above the floor mounted unit 11 and a plenum collar 25 is located there between and is connected to a common stack 26 or expelled back into shop environment. If a single unit 11 is designed to a capacity of 15,000 cubic feet per minute, then the capacity is doubled by adding another unit directly on the top of the first unit 11. In between the units 17 the plenum collar 25 allows the gases to exhaust from the chamber 11a to atmosphere or stack 26 without interruption of operation.

As the influent gases, vapors, and entrained contaminants pass through the system they are electrostatically charged and this assists in accomplishing removal at filters 16 and 17 prior to exhaust through port 27. When desired the spray 20 is available to prime the filter 17 and enhance removal of contaminants.

The stacking characteristics of the units 11 allow the users to increase capacity without additional floor space. The devices thus described are relatively simple to construct and when used in modular clusters each is independently powered.

Having thus disclosed an operative embodiment of my invention others skilled in the art will perceive improvements and modifications therein and such improvements and modifications are intended to be included herein limited only by the scope of my hereinafter appended claims.

I claim:

1. A package separator unit stackable for accommodating multiple installation for increase in capacity comprising:

a rectangular shallow pan-like tank including means for introducing liquid and having an overflow drain;

a case rising from the side walls of said tank and having an opening at the top thereof, said tank, case and top providing a separator chamber;

a blower including a scroll housing having a side entry through one of the side walls of said case and having an outlet duct extending vertically downward and spaced above said tank toward impingement with the center of said tank and said blower spaced in said case apart from contact with all of the side walls thereof;

a horizontal filter bed above said blower and extending transversely in said chamber and through which gases and vapors introduced by said blower must flow in a vertically upward direction toward said opening in said top of said case;

a second tilted filter bed extending transversely in spaced relation above said first mentioned horizontal filter bed and positioned in spaced downward relation from said opening in said top of said case;

and a primer liquid spray means in counter current operative position intermediate said filter beds and in gravity drain communication with said pan-like tank.

2. A plurality of separator modules as in claim 1 in stacked relation, a plenum collar intermediate each pair of said separator modules receiving flow from said top opening and conducting it to an exhaust port.

* * * * *